US011717751B2

United States Patent
Shao et al.

(10) Patent No.: US 11,717,751 B2
(45) Date of Patent: Aug. 8, 2023

(54) IN-GAME DISPLAY CONTROL METHOD AND APPARATUS, STORAGE MEDIUM, PROCESSOR, AND TERMINAL

(71) Applicant: NETEASE (HANGZHOU) NETWORK CO., LTD., Zhejiang (CN)

(72) Inventors: Kun Shao, Zhejiang (CN); Zheng Jin, Zhejiang (CN)

(73) Assignee: NETEASE (HANGZHOU) NETWORK CO.,LTD., Zhejiang (CN)

( * ) Notice: Subject to any disclaimer, the term of this patent is extended or adjusted under 35 U.S.C. 154(b) by 17 days.

(21) Appl. No.: 16/640,355

(22) PCT Filed: May 10, 2019

(86) PCT No.: PCT/CN2019/086462
§ 371 (c)(1),
(2) Date: Feb. 20, 2020

(87) PCT Pub. No.: WO2020/143146
PCT Pub. Date: Jul. 16, 2020

(65) Prior Publication Data
US 2022/0305381 A1 Sep. 29, 2022

(30) Foreign Application Priority Data

Jan. 10, 2019 (CN) .......................... 201910024139.2

(51) Int. Cl.
*A63F 13/525* (2014.01)
*A63F 13/2145* (2014.01)
(Continued)

(52) U.S. Cl.
CPC ........ *A63F 13/525* (2014.09); *A63F 13/2145* (2014.09); *A63F 13/533* (2014.09);
(Continued)

(58) Field of Classification Search
CPC ............................. A63F 13/525; A63F 13/533
See application file for complete search history.

(56) References Cited

U.S. PATENT DOCUMENTS

2005/0009602 A1\* 1/2005 Nishimura .............. A63F 13/10
463/30
2010/0273544 A1\* 10/2010 Koganezawa ...... A63F 13/5375
463/2
(Continued)

FOREIGN PATENT DOCUMENTS

CN 1908949 A 2/2007
CN 107132981 A 9/2017
(Continued)

Primary Examiner — James S. McClellan
(74) Attorney, Agent, or Firm — Yu Gang

(57) ABSTRACT

An in-game display control method and apparatus, a storage medium, a processor, and a terminal are provided. The method includes that: a touch area is configured on a graphical user interface; in response to a first touch operation acting on the touch area, a movement of a preset virtual character in a game scene is controlled according to the first touch operation; a scene display area is updated according to a first position of the preset virtual character in the game scene; whether a preset specific event exists in a preset area of the first position is detected; when the specific event is detected to exist in the preset area of the first position, event attribute information of the specific event is acquired; and the scene display area in the game scene is updated according to the event attribute information.

18 Claims, 4 Drawing Sheets

(51) Int. Cl.
*A63F 13/533* (2014.01)
*G06F 3/04815* (2022.01)
*G06F 3/0488* (2022.01)

(52) U.S. Cl.
CPC ........ *G06F 3/0488* (2013.01); *G06F 3/04815* (2013.01); *A63F 2300/1075* (2013.01); *A63F 2300/308* (2013.01); *A63F 2300/6661* (2013.01)

(56) References Cited

U.S. PATENT DOCUMENTS

| | | | |
|---|---|---|---|
| 2011/0285636 A1* | 11/2011 | Howard | G06F 3/04883 345/173 |
| 2012/0311484 A1* | 12/2012 | Amano | A63F 13/5255 715/782 |
| 2013/0109473 A1* | 5/2013 | Yamashita | A63F 13/2145 463/31 |
| 2014/0002580 A1 | 1/2014 | Bear et al. | |
| 2015/0157940 A1* | 6/2015 | Hall | A63F 13/837 463/31 |

FOREIGN PATENT DOCUMENTS

| | | |
|---|---|---|
| CN | 107741819 A | 2/2018 |
| CN | 107823882 A | 3/2018 |
| CN | 107890664 A | 4/2018 |
| CN | 107982916 A | 5/2018 |
| CN | 108905203 A | 11/2018 |
| CN | 108984293 A | 12/2018 |
| CN | 109675311 A | 4/2019 |
| JP | 2007159800 A | 6/2007 |

\* cited by examiner in-game display control method and apparatus, storage medium, processor, and terminal

CROSS-REFERENCE TO RELATED APPLICATIONS

The present disclosure claims priority of Chinese Patent Application No. 201910024139.2, filed to China Patent Office on Oct. 1, 2019. Contents of the present disclosure are hereby incorporated by reference in entirety of the Chinese Patent Application.

TECHNICAL FIELD

The present disclosure relates to the field of computers, and in particular to an in-game display control method and apparatus, a storage medium, a processor, and a terminal.

BACKGROUND

At present, in mainstream Multiplayer Online Battle Arena (MOBA) mobile games, game scenes are usually observed by a basic manner of fixed lens and lens dragging. In addition, some games will carry out targeted lens interaction design for a few specific types of heroic characters based on the basic manner of fixed lens and lens dragging. Or, some games will also carry out supplementary design in terms of specific lenses. For example, game players may manually switch a lens height mode.

The fixed lens means that a center of the lens is fixed on the body of a game character model by default, and a height of the lens is a fixed value by default. A game player may move a camera by clicking and dragging on a specific area of a screen, and a drag speed of the virtual camera is different in different types of games. In some MOBA mobile games, the longest drag distance may reach ¼ of the maximum battlefield length. In another part of the MOBA mobile games, the longest drag distance may reach almost the entire battlefield.

In addition, when a game player clicks on a mini map in a user interface, the virtual camera will be immediately moved to the clicked position; and when the game player continuously performs a dragging operation after performing the clicking operation, the virtual camera will also follow the movement until the game player releases the hand, and the virtual camera will automatically return to an initial position of this camera.

However, in the current MOBA mobile games on the market, due to limitation of a two-handed interaction mode, most of the games use a fixed lens and lens dragging solution to meet demands of game players for battlefield horizon and lens operations. However, according to the above analysis, it can be known that this solution combining a fixed lens and an active dragging lens can meet the most basic functional requirements, lacks favorable adaptability and scalability for special situations and operations that occur in the game, and cannot meet game experience needs of game players at different levels.

As to the problem mentioned above, no effective solution has been provided yet.

SUMMARY

At least some embodiments of the present disclosure provide an in-game display control method and apparatus, a storage medium, a processor, and a terminal, so as at least to partially solve a technical problem that an adjustment mode of an in-game virtual lens provided in the related art has a single operation mode, lacks favorable adaptability and scalability, and cannot meet game experience requirements of game players at different levels.

In an embodiment of the present disclosure, an in-game display control method is provided. This method is applied to a mobile terminal having at least one processor for executing a software application and a touch screen which is rendered with a graphical user interface. A game scene of a game may include a preset virtual character and a scene display area. The scene display area may be at least part of the game scene. Contents rendered on the graphical user interface may include the scene display area. The method may include that:

a touch area is configured on a graphical user interface; in response to a first touch operation acting on the touch area, a movement of a preset virtual character in the game scene is controlled according to the first touch operation; the scene display area is updated according to a first position of the preset virtual character in the game scene; whether a preset specific event exists in a preset area of the first position is detected; when the specific event is detected to exist in the preset area of the first position, event attribute Information of the specific event is acquired; and the scene display area in the game scene is updated according to the event attribute information.

Optionally, the event attribute information may include at least one of the following: a number of event participants, an event duration, an event occurrence location, an event coverage area size, and a total output damage amount.

Optionally, a virtual camera corresponding to the preset virtual character may be configured in the game scene, and the scene display area in the game scene may be an area shot by the virtual camera.

Optionally, the operation that the scene display area is updated according to the event attribute information may include that: the virtual camera is lifted or lowered to a preset height at a preset speed according to the event attribute information; and the scene display area in the game scene is updated according to the height of the virtual camera.

Optionally, the operation that the scene display area is updated according to the event attribute information may include that: a second position of the specific event is acquired; an adjustment direction of the virtual camera is determined according to the first position and the second position; a movement of the virtual camera is controlled according to the adjustment direction; and the scene display area in the game scene is updated according to the movement of the virtual camera.

Optionally, the method may further include that: a movement direction of the preset virtual character in the game scene is controlled according to the first touch operation; and when the movement direction is away from the specific event, the scene display area is controlled to restore to a state before updating the scene display area in the game scene according to the event attribute information.

Optionally, the method may further include that: a second touch operation acting on a preset position of the graphical user interface is detected; and according to the second touch operation, the scene display area is controlled to restore to a state before updating the scene display area in the game scene according to the event attribute information.

Optionally, the method may further include that: when the specific event ends, the scene display area is controlled to restore to a state before updating the scene display area in the game scene according to the event attribute information.

In another embodiment of the present disclosure, an in-game display control apparatus is further provided. This apparatus is applied to a mobile terminal having at least one processor for executing a software application and a touch screen which is rendered with a graphical user interface. A game scene of a game may include a preset virtual character and a scene display area. The scene display area may be at least part of the game scene, and contents rendered on the graphical user interface may include the scene display area. The apparatus may include: a configuration component, configured to configure a touch area on a graphical user interface; a control component, configured to, in response to a first touch operation acting on the touch area, control a movement of a preset virtual character in the game scene according to the first touch operation; a first update component, configured to update the scene display area according to a first position of the preset virtual character in the game scene; a detection component, configured to detect whether a preset specific event exists in a preset area of the first position; an acquisition component, configured to, when the specific event is detected to exist in the preset area of the first position, acquire event attribute information of the specific event; and a second update component, configured to update the scene display area in the game scene according to the event attribute information.

Optionally, the event attribute information may include at least one of the following: a number of event participants, an event duration, an event occurrence location, an event coverage area size, and a total output damage amount.

Optionally, a virtual camera corresponding to the preset virtual character may be configured in the game scene, and the scene display area in the game scene may be an area shot by the virtual camera.

Optionally, the second update component may include: a processing element, configured to lift or lower the virtual camera to a preset height at a preset speed according to the event attribute information; and a first update element, configured to update the scene display area in the game scene according to the height of the virtual camera.

Optionally, the second update component may include: an acquisition element, configured to acquire a second position of the specific event; a determination element, configured to determine an adjustment direction of the virtual camera according to the first position and the second position; a control element, configured to control a movement of the virtual camera according to the adjustment direction; and a second update element, configured to update the scene display area in the game scene according to the movement of the virtual camera.

Optionally, the apparatus may further include: a first reset component, configured to control a movement direction of the preset virtual character in the game scene according to the first touch operation, and control, when the movement direction is away from the specific event, the scene display area to restore to a state before updating the scene display area in the game scene according to the event attribute information.

Optionally, the apparatus may further include: a second reset component, configured to detect a second touch operation acting on a preset position of the graphical user interface, and control, according to the second touch operation, the scene display area to restore to a state before updating the scene display area in the game scene according to the event attribute information.

Optionally, the apparatus may further include: a third reset component, configured to, when the specific event ends, control the scene display area to restore to a state before updating the scene display area in the game scene according to the event attribute information.

In another embodiment of the present disclosure, a storage medium is also provided, which may include a stored program. When the stored program is run, a device where the storage medium is located may be controlled to perform the in-game display control method as mentioned above.

In another embodiment of the present disclosure, a processor is also provided. The processor may be configured to run a program. When the program is run, the in-game display control method as mentioned above may be performed.

In another embodiment of the present disclosure, a terminal is also provided. The terminal may include at least one processor, a memory, a display device and at least one program. The at least one program may be stored in the memory, and configured to be executed by the at least one processor. The at least one processor may be configured to perform the in-game display control method as mentioned above.

In at least some embodiments of the present disclosure, the touch area is configured on the graphical user interface; according to the first touch operation acting on the touch area, the movement of the preset virtual character in the game scene is controlled, the scene display area is updated according to the first position of the preset virtual character in the game scene, when the preset specific event is detected to exist in the preset area of the first position, event attribute information of the specific event is acquired, and the scene display area in the game scene is updated according to the event attribute information, thereby achieving an aim of updating the scene display area according to the event attribute information when the preset specific event is detected to exist in the preset area of the first position. Therefore, the technical effect of realizing an intelligent scene display area adjustment mode to make the scene display area adjustment mode more flexible and intelligent is achieved, thereby solving the technical problem that the adjustment mode of the in-game virtual lens provided in the related art has the single operation mode, lacks favorable adaptability and scalability, and cannot meet the game experience requirements of game players at different levels.

BRIEF DESCRIPTION OF THE DRAWINGS

The accompanying drawings described herein are used for providing a further understanding of the present disclosure, and constitute a part of the present application, and exemplary embodiments of the present disclosure and the description thereof are used for explaining the present disclosure, but do not constitute improper limitations to the present disclosure. In the drawings.

DETAILED DESCRIPTION

Figure 1:
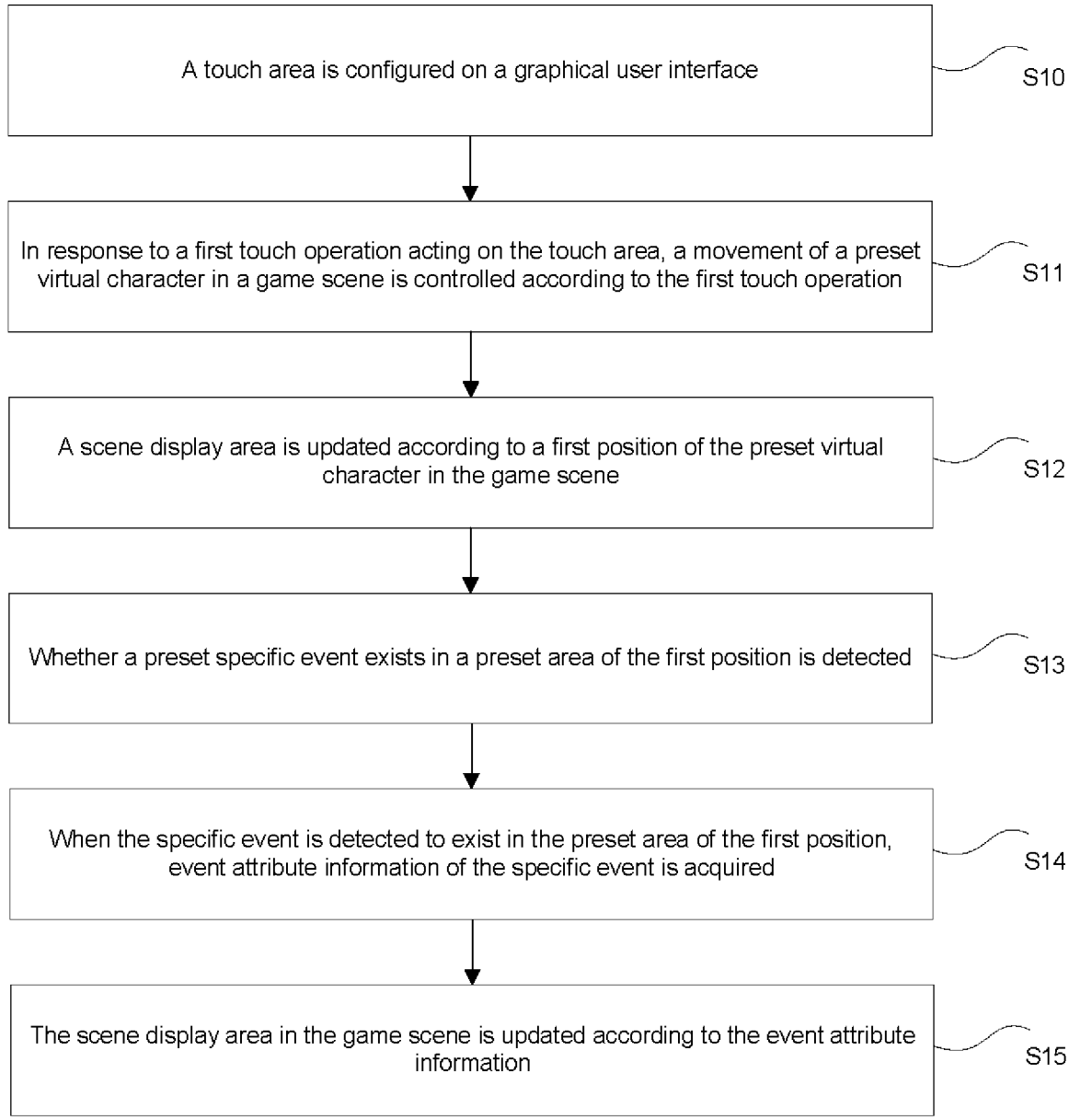
FIG. 1 is a flowchart of an in-game display control method according to an embodiment of the present disclosure.

In order to make those skilled in the art better understand the solutions of the present disclosure, technical solutions in embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "Include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In an embodiment of the present disclosure, an in-game display control method is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The method embodiment may be implemented in a mobile terminal, a computer terminal or a similar computing device. Running on the mobile terminal is taken as an example. The mobile terminal may include at least one processor (the at least one processor may include but is not limited to a processing device such as a Central Processing Unit (CPU), a Graphics Processing Unit (GPU), a Digital Signal Processing (DSP) chip, a Micro Controller Unit (MCU) or a Field Programmable Gate Array (FPGA)) and a memory configured to store data. Optionally, the mobile terminal may further include a transmission apparatus and an input/output device for communication functions. Those skilled in the art can understand that the above structural description is illustrative, and does not limit the structure of the above mobile terminal. For example, the mobile terminal may further include more or less components than those described in the above structural description, or have a configuration different from that described above.

The memory may be configured to store a computer program, for example, a software program and component of application software, such as a computer program corresponding to the in-game display control method in the embodiment of the present disclosure, and the processor executes various functional applications and data processing by running the computer program stored in the memory, that is, implements the above in-game display control method.

The memory may Include a high speed random access memory and may also include a non-volatile memory such as at least one magnetic storage device, a flash memory, or other non-volatile solid state memories. In some examples, the memory may further Include memories remotely located relative to the processor, which may be connected to the mobile terminal over a network. The examples of such networks include, but are not limited to, the Internet, the Intranet, local area networks, mobile communication networks, and combinations thereof.

The transmission device is configured to receive or send data via a network. The above specific network example may include a wireless network provided by a communication provider of the mobile terminal. In one example, the transmission device includes a Network Interface Controller (NIC) that may be connected to other network devices through a base station to communicate with the Internet. In one example, the transmission device may be a Radio Frequency (RF) component for communicating with the Internet wirelessly.

In the present embodiment, an in-game display control method running on the above mobile terminal is provided. This method is applied to a mobile terminal having at least one processor for executing a software application and a touch screen which is rendered with a graphical user interface. A game scene of a game includes a preset virtual character and a scene display area. The scene display area is at least part of the game scene. Contents rendered on the graphical user Interface include the scene display area. FIG. 1 is a flowchart of an in-game display control method according to an embodiment of the present disclosure. As shown in FIG. 1, the method Includes the following steps.

At step S10, a touch area is configured on a graphical user interface.

At step S11, in response to a first touch operation acting on the touch area, a movement of a preset virtual character in the game scene is controlled according to the first touch operation.

At step S12, the scene display area is updated according to a first position of the preset virtual character in the game scene.

At step S13, whether a preset specific event exists in a preset area of the first position is detected.

At step S14, when the specific event is detected to exist in the preset area of the first position, event attribute information of the specific event is acquired.

At step S15, the scene display area in the game scene is updated according to the event attribute information.

By means of the above steps, the touch area is configured on the graphical user interface; according to the first touch operation acting on the touch area, the movement of the preset virtual character in the game scene is controlled, the scene display area is updated according to the first position of the preset virtual character in the game scene, when the preset specific event is detected to exist in the preset area of the first position, event attribute information of the specific event is acquired, and the scene display area in the game scene is updated according to the event attribute information, thereby achieving an aim of updating the scene display area according to the event attribute information when the preset specific event is detected to exist in the preset area of the first position. Therefore, the technical effect of realizing an intelligent scene display area adjustment mode to make the scene display area adjustment mode more flexible and intelligent is achieved, thereby solving the technical problem that the adjustment mode of the in-game virtual lens provided in the related art has the single operation mode, lacks favorable adaptability and scalability, and cannot meet the game experience requirements of game players at different levels.

It is to be noted that the operation of controlling the movement of the preset virtual character in the game scene in response to the first touch operation to update the scene display area according to the first position of the preset virtual character in the game scene described at step S11 to step S12 does not have a strict timing relationship with the operation of updating the scene display area in the game scene according to the event attribute information described at step S15. In other words, the operation of updating the scene display area described at step S11 to step S12 may occur before the operation of updating the scene display area described at step S15, may also occur after the operation of updating the scene display area described at step S15, or may also occur while the operation of updating the scene display area described at step S15. Therefore, it is not strictly limited in the embodiments of the present disclosure.

The touch area may be a direction control located on a lower left area of the graphical user interface. The preset area may be flexibly set according to a size of the game scene. The preset specific event may include, but not limited to, multiple virtual characters having a group battle in a specific area (for example, a wild area).

In the related art, the game player may update the scene display area by performing a clicking operation on a mini map area or a dragging operation on the horizon adjustment area. However, when viewing the specific event in this operation mode, it is possible to observe the specific event by constantly adjusting the horizon area manually by the game player, and it is very likely that the best opportunity for combat has been missed at this time. Conversely, by means of the technical solutions provided by the embodiments of the present disclosure, whether a specific event exists in the preset area of the first position is detected, the scene display area in the game scene may be automatically updated according to the event attribute information of the specific event. Therefore, while an operation complexity of a game player is reduced, the specific event can be viewed as soon as possible in the shortest time, so as to respond to the specific event in time.

In an optional embodiment, the event attribute information may include, but not limited to, at least one of the following: a number of event participants, an event duration, an event occurrence location, an event coverage area size, and a total output damage amount.

Optionally, a virtual camera corresponding to the preset virtual character is configured in the game scene, and the scene display area in the game scene is an area shot by the virtual camera.

In an optional embodiment, the virtual camera may be fixed on a preset virtual character controlled by the game player, move according to the movement of the virtual character, and rotate according to the rotation of the virtual character, which is similar to the subjective perspective of the virtual character. Therefore, the scene display area in the game scene is an area shot by the virtual camera. Of course, the game may also be set at a position relative to the preset virtual character controlled by the game player, for example, set at a preset position above the preset virtual character and follow the virtual character to move, which is similar to a third party's perspective in respective to the virtual character. Therefore, the scene display area in the game scene is an area shot by the virtual camera. The following optional embodiments mainly take the virtual camera fixed at a relative position of the virtual character controlled by a game player as an example for detailed description. The implementation process is also applicable to setting the virtual camera on the virtual character controlled by the game player.

Optionally, at step S15, the operation that the scene display area is updated according to the event attribute information may Include the following execution steps.

At step S151, the virtual camera is lifted or lowered to a preset height at a preset speed according to the event attribute information.

At step S152, the scene display area in the game scene is updated according to the height of the virtual camera.

The above event attribute information (that is, at least one of a number of event participants, an event duration, an event occurrence location, an event coverage area size, and a total output damage amount) may be used for flexibly lifting or lowering the virtual camera to the preset height at the preset speed according to the actual situation. For example, it is supposed that each of the two opponents has four virtual characters participating in a team battle at the location of the specific event. At this time, various types of Information such as the number of event participants, the event duration, the event occurrence location, the event coverage area size, and the total output damage amount are considered. It is necessary to expand the horizon of a game player. For this purpose, the virtual camera is lifted to the preset height at the preset speed. With casualties of the virtual characters participating in the team battle between the two opponents, the number of virtual characters participating in the battle will gradually decrease. At this time, the horizon of the game player may be appropriately reduced. For this purpose, the virtual camera is lowered to the preset height at the preset speed.

Figure 2:
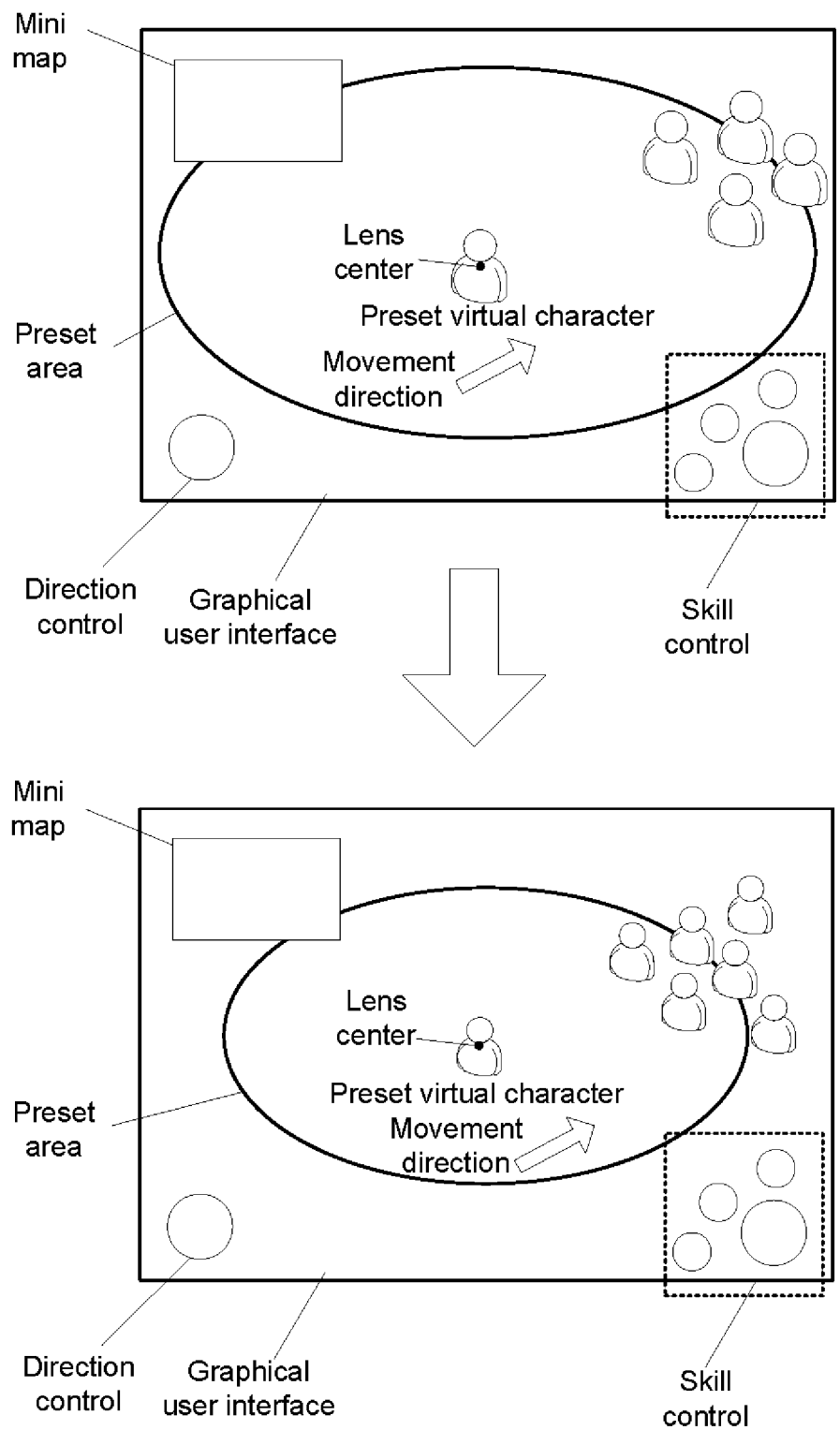
FIG. 2 is a schematic diagram of an in-game display control method according to a first optional embodiment of the present disclosure.

FIG. 2 is a schematic diagram of an in-game display control method according to a first optional embodiment of the present disclosure. As shown in FIG. 2, when a large-scale team battle is detected to exist in a preset area of a first position of the preset virtual character in a game scene, in order to facilitate game players to obtain a better horizon of the game, and to more clearly observe the casualties and occupation trends of the participating opponents, a virtual camera needs to be lifted to a preset height at a preset speed. Then, a scene display area in the game scene is updated according to the height of the virtual camera.

Optionally, at step S15, the operation that the scene display area is updated according to the event attribute information may Include the following execution steps.

At step S153, a second position of the specific event Is acquired.

At step S154, an adjustment direction of the virtual camera is determined according to the first position and the second position.

At step S155, a movement of the virtual camera is controlled according to the adjustment direction.

At step S156, the scene display area in the game scene is updated according to the movement of the virtual camera.

In order to enable the game player to obtain a better game horizon, after obtaining the first position of the preset virtual character and the second position of the specific event, the adjustment direction of the virtual camera may be determined according to the first position and the second position. In other words, the virtual camera may be fixed on a preset virtual character controlled by the game player and shifted to a second position where the specific event is located (that is, the virtual camera moves in a direction from the first position to the second position). At this time, with a shift of the virtual camera, the scene display area is continuously updated, and the preset virtual character and the specific event are kept in the same screen state in the updated scene display area during the continuous update of the scene display area. That is, in an optional embodiment, the virtual camera may gradually move from the first position where the preset virtual character is located to a specific focus position between the first position where the preset virtual character is located and the second position where the specific event is located, so that the preset virtual character and the specific event are both in the updated scene display area. In another optional embodiment, the virtual camera may gradually move from the first position where the preset virtual character is located to the second position where the specific event is located, so that the specific event is displayed at the center position of the graphical user interface.

Figure 3:
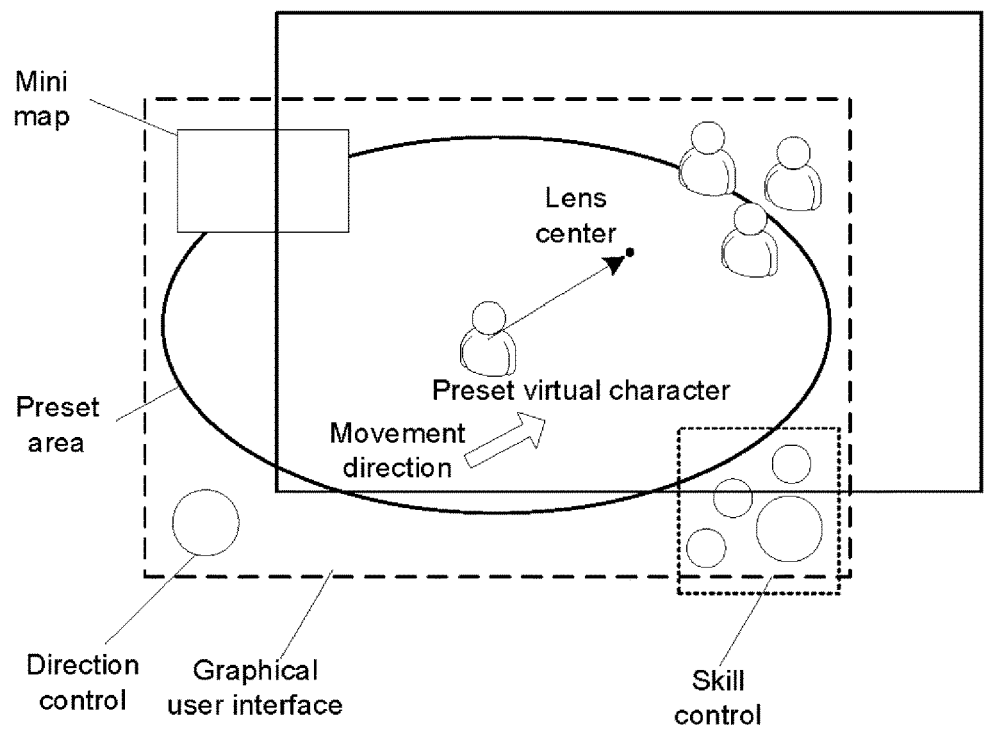
FIG. 3 is a schematic diagram of an in-game display control method according to a second optional embodiment of the present disclosure.

FIG. 3 is a schematic diagram of an in-game display control method according to a second optional embodiment of the present disclosure. As shown in FIG. 3, when a large-scale team battle is detected to exist in a preset area of a first position of a preset virtual character in a game scene, in order to facilitate game players to obtain a better horizon of the game, and to more clearly observe the casualties and occupation trends of the participating opponents, it is necessary to control the virtual camera to move uniformly or at an accelerated speed in a direction from the first position to the second position, and then update the scene display area in the game scene according to the movement of the virtual camera.

Optionally, on the basis of steps S10 to S15, the following execution steps may be further included.

At step S16, a movement direction of the preset virtual character in the game scene is controlled according to the first touch operation, and when the movement direction is away from the specific event, the scene display area is controlled to restore to a state before updating the scene display area in the game scene according to the event attribute information.

When the game player controls the preset virtual character to continuously move toward the location of a specific event through a direction control, the scene display area in the game scene needs to be updated according to the event attribute information. However, when the preset virtual character moves toward an opposite direction to a preset position under the control of the direction control on the basis of continuously moving toward the location of the specific event under the control of the direction control, so that continuous movement of the preset virtual character toward the location of the specific event is changed into continuous movement away from the location of the specific event. At this time, the scene display area may be controlled by changing the movement direction to restore to the state before updating the scene display area in the game scene according to the event attribute information. This state may be calculated by lens logic to automatically reset the virtual camera to a current position of the preset virtual character to restore the original scene display area. Alternatively, when that a preset specific event exists in the preset area of the first position, the game player controls the preset virtual character to continuously move directly away from the location of the specific event through the direction control. At this time, the scene display area may be also controlled to restore to a state before updating the scene display area in the game scene according to the event attribute information. The factors indicting that the movement direction is away from the specific event may Include, but not limited to, during the team battle, the number of personnel in a faction of the preset virtual character is obviously inferior; and the preset virtual character finds that the enemy has a single virtual character trying to sneak in our base.

Optionally, on the basis of steps S10 to S15, the following execution steps may be further Included.

At step S17, a second touch operation acting on a preset position of the graphical user interface is detected.

At step S18, according to the second touch operation, the scene display area is controlled to restore to a state before updating the scene display area in the game scene according to the event attribute information.

The above second touch operation acting on the preset position in the graphical user interface has the function of canceling attention to the specific event and resetting the virtual camera. The second touch operation may be a touch operation acting on a specific cancellation control or a touch operation acting on any blank area on the graphical interface. Therefore, through the second touch operation, the scene display area may be controlled to restore to the state before updating the scene display area in the game scene according to the event attribute information. This state may be calculated by lens logic to automatically reset the virtual camera to a current position of the preset virtual character to restore the original scene display area.

Optionally, on the basis of steps S10 to S15, the following execution steps may be further included.

At step S19, when the specific event ends, the scene display area is controlled to restore to a state before updating the scene display area in the game scene according to the event attribute information.

When the specific event (for example, team battle) ends, the virtual characters participating in the team battle may leave the location of the specific event due to many factors such as death, returning to the base for healing, continuing to jungle, and defending the tower, there will no longer be a need to focus on the specific event.

Therefore, when the specific event ends, the scene display area is controlled to restore to the state before updating the scene display area in the game scene according to the event attribute information. This state may be calculated by lens logic to automatically reset the virtual camera to the current position of the preset virtual character to restore the original scene display area.

By combining the foregoing embodiments, the following technical effects can be achieved.

At one, the comprehensive optimization of the current mainstream lens solutions has made up for the shortcomings of fixed and rigid lens modes in the current mainstream MOBA mobile game lens solutions and reliance on frequent operations by game players, which makes the operation of game lenses more flexible and intelligent. In addition, it has favorable extensibility, and leaves more design space for changes such as new gameplay methods and new characters to make the lens solution of the game more diversified and customized.

At two, for intelligent lens adjustment modes, according to differences of operating behaviors of game players and game situations where the game players are located, different ways of lens assistance are provided to meet the special needs of a game horizon, the fine adjustment operation of the lens is intelligentized, the operation burdens of the game players are reduced, and the game players can obtain current game Information needed most in the most relaxed way, thereby Improving the efficiency of game information transmission and providing the game players with a smoother game experience.

At three, game players and novice players with limited operation levels who are unable to use lens operations and receive battlefield information well can adapt to the game faster, and master game lens operation methods, and an intelligent solution is provided for a special lens operation, thereby reducing the learning cost of the game players, lowering the overall operation threshold of the game, and Improving the coverage area of the corresponding user group of the game.

At four, the game players with high operation level are enabled to complete more fine game operations with the most convenient operations, thereby providing more room for Improvement in the game skills of such game players, improving the game experience of such game players, and facilitating the retention of gamers at this level.

At five, as an overall optimization solution, it can adapt to the needs of game players at different levels and provide favorable conditions for the overall promotion and propagation of the game.

Through the description of the above Implementation modes, those skilled in the art can clearly understand that the method according to the above embodiment may be implemented by means of software plus a necessary general hardware platform, and of course, may also be implemented through hardware, but in many cases, the former is a better Implementation manner. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

In the present embodiment, an in-game display control apparatus is further provided, which is configured to implement the above embodiments and optional Implementation manners, and the description thereof has been omitted. As used below, the term "component" may implement a combination of software and/or hardware of a predetermined function. Although the apparatus described in the following embodiments is optionally implemented by software, hardware or a combination of software and hardware is also possible and conceived.

Figure 4:
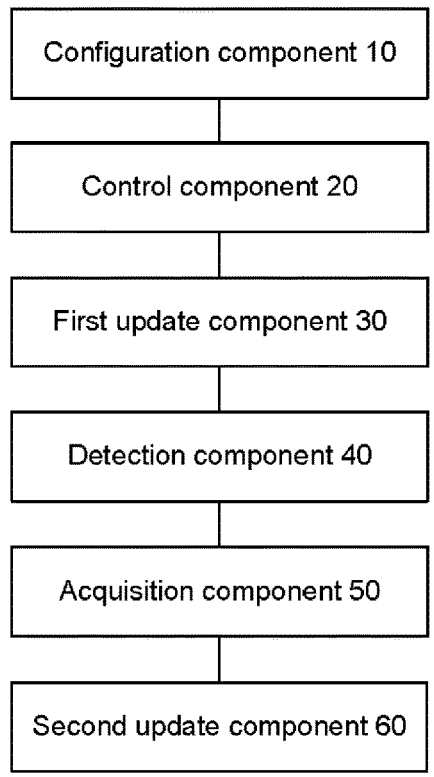
FIG. 4 is a structural block diagram of an in-game display control apparatus according to an embodiment of the present disclosure.

FIG. 4 is a structural block diagram of an in-game display control apparatus according to an embodiment of the present disclosure. As shown in FIG. 4, this apparatus is applied to a mobile terminal having at least one processor for executing a software application and a touch screen which is rendered with a graphical user Interface, a game scene of a game includes a preset virtual character and a scene display area, the scene display area is at least part of the game scene, and contents rendered on the graphical user interface includes the scene display area. The apparatus includes: a configuration component 10, configured to configure a touch area on a graphical user Interface; a control component 20, configured to, in response to a first touch operation acting on the touch area, control a movement of a preset virtual character in the game scene according to the first touch operation; a first update component 30, configured to update the scene display area according to a first position of the preset virtual character in the game scene; a detection component 40, configured to detect whether a preset specific event exists in a preset area of the first position; an acquisition component 50, configured to, when the specific event is detected to exist in the preset area of the first position, acquire event attribute Information of the specific event; and a second update component 60, configured to update the scene display area in the game scene according to the event attribute information.

Optionally, the event attribute information includes at least one of the following: a number of event participants, an event duration, an event occurrence location, an event coverage area size, and a total output damage amount.

Optionally, a virtual camera corresponding to the preset virtual character is configured in the game scene, and the scene display area in the game scene is an area shot by the virtual camera.

Optionally, the second update component 60 includes: a processing element (not shown in the figure), configured to lift or lower the virtual camera to a preset height at a preset speed according to the event attribute information; and a first update element (not shown in the figure), configured to update the scene display area in the game scene according to the height of the virtual camera.

Optionally, the second update component 60 includes: an acquisition element (not shown in the figure), configured to acquire a second position of the specific event; a determination element (not shown in the figure), configured to determine an adjustment direction of the virtual camera according to the first position and the second position; a control element (not shown in the figure), configured to control the movement of the virtual camera according to the adjustment direction; and a second update element (not shown in the figure), configured to update the scene display area in the game scene according to the movement of the virtual camera.

Figure 5:
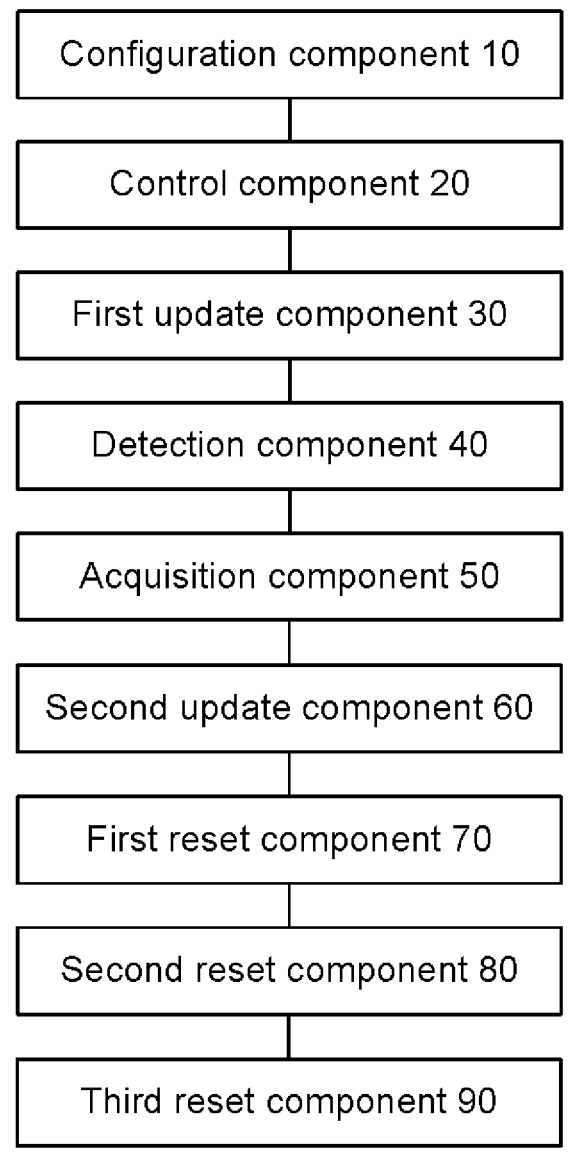
FIG. 5 is a structural block diagram of an in-game display control apparatus according to an optional embodiment of the present disclosure.

Optionally, FIG. 5 is a structural block diagram of an in-game display control apparatus according to an optional embodiment of the present disclosure. As shown in FIG. 5, in addition to all the components shown in FIG. 4, the apparatus further includes: a first reset component 70, configured to control a movement direction of the preset virtual character in the game scene according to the first touch operation, and control, when the movement direction is away from the specific event, the scene display area to restore to a state before updating the scene display area in the game scene according to the event attribute information.

Optionally, as shown in FIG. 5, the apparatus further includes: a second reset component 80, configured to detect a second touch operation acting on a preset position of the graphical user interface, and control, according to the second touch operation, the scene display area to restore to a state before updating the scene display area in the game scene according to the event attribute information.

Optionally, as shown in FIG. 5, the apparatus further includes: a third reset component 90, configured to, when the specific event ends, control the scene display area to restore to a state before updating the scene display area in the game scene according to the event attribute information.

It is to be noted that each of the above components may be implemented by software or hardware. The latter may be implemented by, but not limited to, the following manners: the above components are all located in the same processor; or, the above components are located in different processors respectively in any combined form.

Another embodiment of the present disclosure further provides a storage medium. The storage medium stores a computer program, where the computer program is configured to perform the steps in any one of the above method embodiments during running.

Optionally, in the present embodiment, the storage medium may be configured to store the computer program for performing the following steps.

At step S1, a touch area is configured on a graphical user interface.

At step S2, in response to a first touch operation acting on the touch area, a movement of a preset virtual character in a game scene is controlled according to the first touch operation.

At step S3, a scene display area is updated according to a first position of the preset virtual character in the game scene.

At step S4, whether a preset specific event exists in a preset area of the first position is detected.

At step S5, when the specific event is detected to exist in the preset area of the first position, event attribute information of the specific event is acquired.

At step S6, the scene display area in the game scene is updated according to the event attribute information.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

Another embodiment of the present disclosure also provides a processor. The processor is configured to run a computer program to perform the steps in any one of the above method embodiments.

Optionally, in the present embodiment, the processor may be configured to perform the following steps through the computer program.

At step S1, a touch area is configured on a graphical user interface.

At step S2, in response to a first touch operation acting on the touch area, a movement of a preset virtual character in a game scene is controlled according to the first touch operation.

At step S3, a scene display area is updated according to a first position of the preset virtual character in the game scene.

At step S4, whether a preset specific event exists in a preset area of the first position is detected.

At step S5, when the specific event is detected to exist in the preset area of the first position, event attribute information of the specific event is acquired.

At step S6, the scene display area in the game scene is updated according to the event attribute information.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into one processing element, or each element may exist physically separately, or at least two elements may be integrated into one element. The integrated element may be implemented in a hardware form and may also be implemented in form of software functional element.

The integrated element may be stored in a computer-readable storage medium when being implemented in the form of a software functional element and sold or used as a standalone product. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementations of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. An in-game display control method, applied to a mobile terminal having at least one processor for executing a software application and a touch screen which is rendered with a graphical user interface, a game scene of a game comprising a preset virtual character and a scene display area, the scene display area being at least part of the game scene, contents rendered on the graphical user interface comprising the scene display area, the method comprising:

configuring a touch area on a graphical user interface;

in response to a first touch operation acting on the touch area, controlling a movement of the preset virtual character in the game scene according to the first touch operation;

controlling a virtual camera configured in the game scene according to a first position of the preset virtual character in the game scene, to update a game horizon corresponding to the scene display area in the game scene;

detecting whether a preset specific event exists in a preset area of the first position;

when the specific event is detected to exist in the preset area of the first position, acquiring event attribute information of the specific event; and controlling the virtual camera to move in a direction from the first position to a second position of the specific event according to the event attribute information, to update the game horizon corresponding to the scene display area in the game scene.

2. The method as claimed in claim 1, wherein the event attribute information comprises at least one of the following:

a number of event participants, an event duration, an event occurrence location, an event coverage area size, and a total output damage amount.

3. The method as claimed in claim 1, wherein a virtual camera corresponding to the preset virtual character is configured in the game scene, and the scene display area in the game scene is an area shot by the virtual camera.

4. The method as claimed in claim 3, wherein controlling the virtual camera according to the event attribute information, to update the game horizon corresponding to the scene display area in the game scene comprises:
lifting or lowering the virtual camera to a preset height at a preset speed according to the event attribute information; and
updating the game horizon corresponding to the scene display area in the game scene according to the height of the virtual camera.

5. The method as claimed in claim 1, wherein controlling the virtual camera according to the event attribute information, to update the game horizon corresponding to the scene display area in the game scene comprises:
acquiring the second position of the specific event;
determining an adjustment direction of the virtual camera according to the first position and the second position;
controlling a movement of the virtual camera according to the adjustment direction; and
updating the game horizon corresponding to the scene display area in the game scene according to the movement of the virtual camera.

6. The method as claimed in claim 5, wherein the virtual camera moves in a direction from the first position to the second position.

7. The method as claimed in claim 5, wherein with a shift of the virtual camera, the scene display area is continuously updated, and the preset virtual character and the specific event are kept in the same screen state in the updated scene display area during the continuous update of the scene display area.

8. The method as claimed in claim 5, wherein the virtual camera gradually moves from the first position where the preset virtual character is located to a specific focus position between the first position where the preset virtual character is located and the second position where the specific event is located.

9. The method as claimed in claim 5, wherein the virtual camera gradually moves from the first position where the preset virtual character is located to the second position where the specific event is located.

10. The method as claimed in claim 1, further comprising:
controlling a movement direction of the preset virtual character in the game scene according to the first touch operation; and
when the movement direction is away from the specific event, controlling the scene display area to restore to a state before updating the scene display area in the game scene according to the event attribute information.

11. The method as claimed in claim 10, wherein the scene display area is controlled by changing the movement direction to restore to the state before updating the scene display area in the game scene according to the event attribute information, wherein this state is calculated to automatically reset the virtual camera to a current position of the preset virtual character to restore the original scene display area.

12. The method as claimed in claim 1, further comprising:
detecting a second touch operation acting on a preset position of the graphical user interface; and
controlling, according to the second touch operation, the scene display area to restore to a state before updating the scene display area in the game scene according to the event attribute information.

13. The method as claimed in claim 12, wherein the second touch operation acting on the preset position in the graphical user interface has the function of canceling attention to the specific event and resetting the virtual camera.

14. The method as claimed in claim 12, wherein the second touch operation is a touch operation acting on a specific cancellation control or a touch operation acting on any blank area on the graphical interface.

15. The method as claimed in claim 1, further comprising:
when the specific event ends, controlling the scene display area to restore to a state before updating the scene display area in the game scene according to the event attribute information.

16. The method as claimed in claim 1, wherein the touch area is a direction control located on a lower left area of the graphical user interface.

17. A non-transitory storage medium, comprising a stored program, wherein when the stored program is run, a device where the storage medium is located is controlled to perform the following steps:
configuring a touch area on a graphical user interface;
in response to a first touch operation acting on the touch area, controlling a movement of a preset virtual character in a game scene according to the first touch operation;
controlling a virtual camera configured in the game scene according to a first position of the preset virtual character in the game scene, to update a game horizon corresponding to a scene display area in the game scene;
detecting whether a preset specific event exists in a preset area of the first position;
when the specific event is detected to exist in the preset area of the first position, acquiring event attribute information of the specific event; and
controlling the virtual camera to move in a direction from the first position to a second position of the specific event according to the event attribute information, to update the game horizon corresponding to the scene display area in the game scene.

18. A terminal, comprising: at least one processors, a memory, a display device, and at least one program, wherein the at least one program is stored in the memory, and configured to be run by the at least one processor, the at least one program being configured to perform the following steps:
configuring a touch area on a graphical user interface;
in response to a first touch operation acting on the touch area, controlling a movement of a preset virtual character in a game scene according to the first touch operation;
controlling a virtual camera configured in the game scene according to a first position of the preset virtual character in the game scene, to update a game horizon corresponding to the scene display area in the game scene;
detecting whether a preset specific event exists in a preset area of the first position;
when the specific event is detected to exist in the preset area of the first position, acquiring event attribute information of the specific event; and
controlling the virtual camera to move in a direction from the first position to a second position of the specific event according to the event attribute information, to update the game horizon corresponding to the scene display area in the game scene.

\* \* \* \* \*